United States Patent
Ito

(10) Patent No.: US 7,639,836 B2
(45) Date of Patent: Dec. 29, 2009

(54) IMAGE COPYING DEVICE AND IMAGE PROCESSING SYSTEM

(75) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 11/534,832

(22) Filed: Sep. 25, 2006

(65) Prior Publication Data

US 2007/0076261 A1 Apr. 5, 2007

(30) Foreign Application Priority Data

| Sep. 30, 2005 | (JP) | ............................. 2005-288502 |
| May 17, 2006 | (JP) | ............................. 2006-138320 |
| Aug. 25, 2006 | (JP) | ............................. 2006-229486 |

(51) Int. Cl.
*G06K 9/00* (2006.01)

(52) U.S. Cl. ........................ 382/100; 382/232; 382/305; 358/3.28; 399/366

(58) Field of Classification Search ................. 382/100, 382/232, 305; 358/3.28; 399/366; 380/201, 380/231, 51, 54, 55
See application file for complete search history.

(56) References Cited

U.S. PATENT DOCUMENTS 6,922,777 B1 7/2005 Iwamura

2005/0041835 A1* 2/2005 Reed et al. ................... 382/100
2008/0149713 A1* 6/2008 Brundage .................... 235/435

FOREIGN PATENT DOCUMENTS

| JP | 2001-223880 | 8/2001 |
| JP | 3472188 | 9/2003 |
| JP | 2005-175773 | 6/2005 |

\* cited by examiner

*Primary Examiner*—Samir A. Ahmed
*Assistant Examiner*—Ali Bayat
(74) *Attorney, Agent, or Firm*—Fitzpatrick, Cella, Harper & Scinto

(57) ABSTRACT

An image copying device includes: a setting section setting an image processing condition specified by a user; a determination section determining whether or not an image processing condition is embedded in a read image obtained by reading out a sheet; and a control section that, if the determination section determines that the image processing condition is not embedded in the read image, performs control for generating a copied material of the read image by using the image processing condition set by the setting section. If the determination section determines that an image processing condition is embedded in the read image, the control section performs control for generating a copied material by using the embedded image processing condition and a part of the image processing condition set by the setting section, the part not conflicting with the embedded image processing condition.

11 Claims, 11 Drawing Sheets

| | DIGITAL WATERMARK A | |
|---|---|---|
| BACKGROUND ELIMINATION | × | READING RESOLUTION ×0.2 |
| READING RESOLUTION | | |
| EXPANSION AND REDUCTION | × | × |
| ... | ... | × |

FIG.3

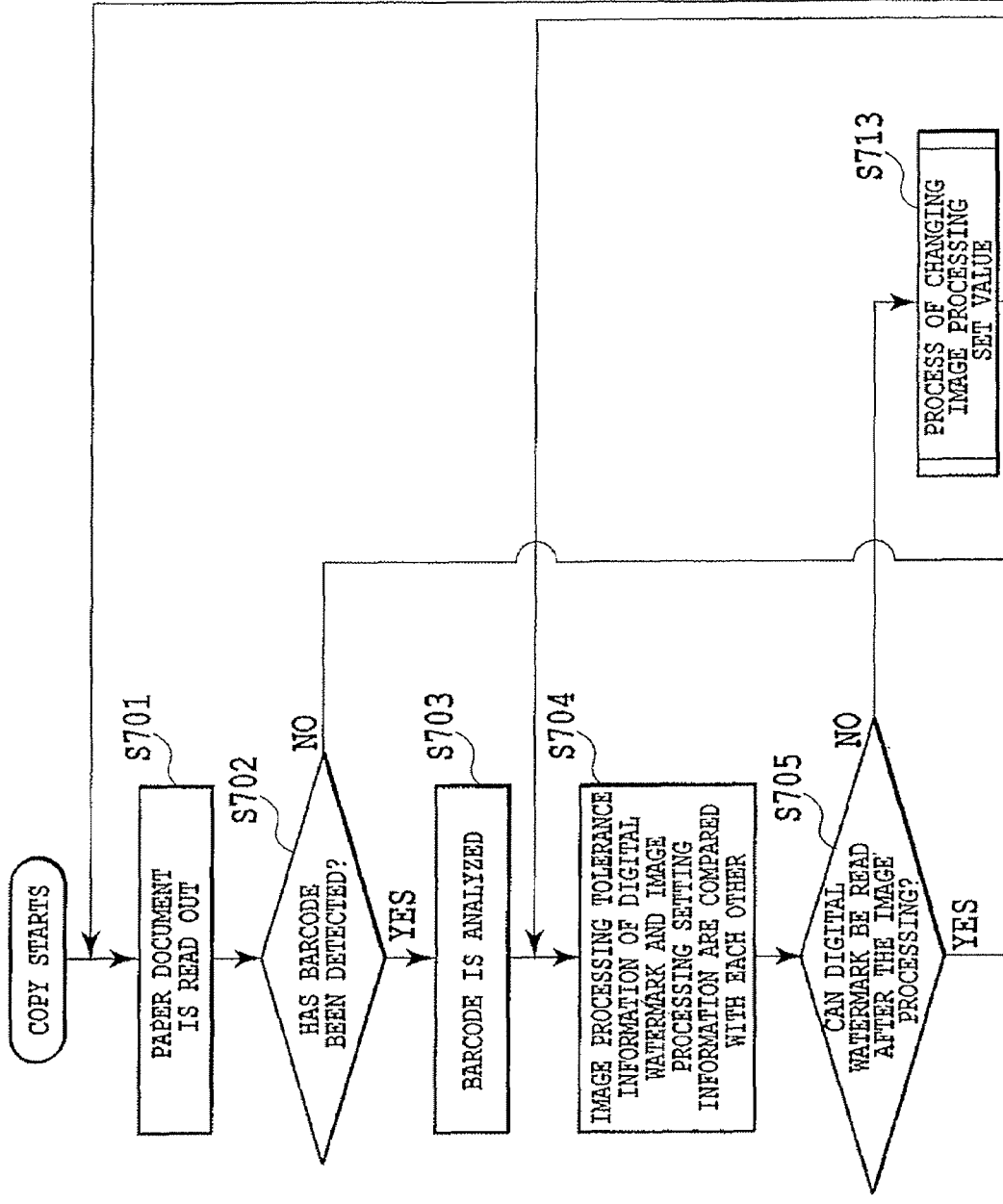

IMAGE COPYING DEVICE AND IMAGE PROCESSING SYSTEM

BACKGROUND OF THE INVENTION

1. Field of the Invention

The present invention relates to a copying device and a copying method of copying a printed material. In particular, the invention relates to a copying device and a copying method of copying a printed material printed with an image in which a digital watermark is embedded.

2. Description of the Related Art

There is a technique of copying printed material and generating copied material on the basis of user interface settings. This is a technique of performing a copy process based on the intention of the user that generates the copied material.

In addition, there is also a technique of copying printed material and generating a copied material under an image processing condition embedded in a digital watermark image within the printed material. This is a technique of performing a copy process based on the intention of the user, who creates the printed material, with respect to a user who intends to generate copied material. For example, Japanese Patent No. 3,472,188 discloses an information processing system that performs protection of copyright, prevention of forgery, or recording of information by embedding digital watermark information in input information, such as digital image data or digital sound data.

However, there is no technique that considers both intentions, that is, the intention of the user that creates the printed material and the intention of the user that generates the copied material.

SUMMARY OF THE INVENTION

It is desirable to provide an image copying device capable of generating copied material in consideration of both the intention of the user that creates printed material and the intention of the user that generates the copied material.

According to an embodiment of the invention, an image copying device includes: a setting section setting an image processing condition specified by a user; a determination section determining whether or not an image processing condition is embedded in a read image obtained by reading out a sheet; and a control section that, if the determination section determines that the image processing condition is not embedded in the read image, performs control for generating a copied material of the read image by using the image processing condition set by the setting section. If the determination section determines that an image processing condition is embedded in the read image, the control section performs control for generating a copied material by using the embedded image processing condition and a part of the image processing condition set by the setting section, the part not conflicting with the embedded image processing condition.

Further, according to another embodiment of the invention, an image copying device includes: a setting section setting an image processing condition specified by a user; a determination section determining whether or not an image processing condition is embedded in a read image obtained by reading out a sheet; and a control section that, if the determination section determines that an image processing condition is not embedded, performs control for generating a copied material of the read image by using the image processing condition set by the setting section. If the determination section determines that an image processing condition is embedded in the read image, the control section sets a new image processing condition by changing a part of the image processing condition set by the setting section, the part conflicting with the embedded image processing condition, and performs control for generating a copied material by using the newly set image processing condition.

Furthermore, according to still another embodiment of the invention, an image processing system includes: an image generating device that outputs an image including a first digital watermark image and a second digital watermark image whose tolerance is higher than that of the first digital watermark image; and an image copying device that generates a copied material of the image. The image generating device includes: a determination section determining an image processing condition to be included in the second digital watermark image on the basis of a characteristic of the first digital watermark image; and an embedding section causing the image processing condition determined by the determination section to be included in the second digital watermark image. The image copying device includes: a setting section setting an image processing condition specified by a user; a determination section determining whether or not an image processing condition is embedded in an image output by the image generating device; and a control section that, if the determination section determines that an image processing condition is not embedded in the image, performs control for generating a copied material of the image by using the image processing condition set by the setting section. If the determination section determines that an image processing condition is embedded in the image, the control section performs control for generating a copied material by using the embedded image processing condition and a part of the image processing condition set by the setting section, the part not conflicting with the embedded image processing condition.

Furthermore, according to still another embodiment of the invention, an image copying method includes the steps of: setting an image processing condition specified by a user; determining whether or not an image processing condition is embedded in a read image obtained by reading out a sheet; and performing control for generating a copied material of the read image by using the set image processing condition if it is determined that the image processing condition is not embedded in the read image. In the performing of the control, if it is determined that an image processing condition is embedded in the read image, control for generating a copied material is performed by using the embedded image processing condition and a part of the set image processing condition not conflicting with the embedded image processing condition.

Furthermore, according to still another embodiment of the invention, an image copying method includes the steps of: setting an image processing condition specified by a user; determining whether or not an image processing condition is embedded in a read image obtained by reading out a sheet; and performing control for generating a copied material of the read image by using the set image processing condition if it is determined that the image processing condition is not embedded in the read image. In the performing of the control, if it is determined that an image processing condition is embedded in the read image, a new image processing condition is set by modifying a part of the set image processing condition conflicting with the embedded image processing condition and then control for generating a copied material is performed by using the newly set image processing condition.

Furthermore, according to still another embodiment of the invention, an image processing method of generating a copied material of an image including a first digital watermark image and a second digital watermark image whose tolerance is higher than that of the first digital watermark image includes the steps of: determining an image processing condition to be included in the second digital watermark image on the basis of a characteristic of the first digital watermark image; embedding the determined image processing condition in the second digital watermark image; setting an image processing condition specified by a user; determining whether or not an image processing condition is embedded in the image; and performing control for generating the copied material of the image by using the set image processing condition if it is determined that an image processing condition is not embedded in the image. In the performing of the control, if it is determined that an image processing condition is embedded in a read image, control for generating a copied material is performed by using the embedded image processing condition and a part of the set image processing condition not conflicting with the embedded image processing condition.

Furthermore, according to still another embodiment of the invention, a computer-readable recording medium recording a program for causing a computer to execute an image copying method, the method includes the steps of: setting in a computer an image processing condition specified by a user; determining whether or not an image processing condition is embedded in a read image obtained by reading out a sheet; and performing control for generating a copied material of the read image by using the set image processing condition if it is determined that the image processing condition is not embedded in the read image. In the performing of the control, if it is determined that an image processing condition is embedded in the read image, control for generating a copied material is performed by using the embedded image processing condition and a part of the set image processing condition not conflicting with the embedded image processing condition.

Furthermore, according to still another embodiment of the invention, a computer-readable recording medium recording a program for causing a computer to execute an image copying method, the method includes the steps of: setting in a computer an image processing condition specified by a user; determining whether or not an image processing condition is embedded in a read image obtained by reading out a sheet; and performing control for generating a copied material of the read image by using the set image processing condition if it is determined that the image processing condition is not embedded in the read image. In the performing of the control, if it is determined that an image processing condition is embedded in the read image, a new image processing condition is set by modifying a part of the set image processing condition conflicting with the embedded image processing condition and then control for generating a copied material by using the newly set image processing condition is performed.

According to the embodiments of the invention, when copying recording paper, which is printed with an image in which a digital watermark is embedded, by using a copying machine or when converting contents of the recording paper into digital data, it is possible to prevent a copied material or digital data, in which a digital watermark embedded in an original recording paper is lost, from being generated contrary to the invention of the user.

Further features of the present invention will become apparent from the following description of exemplary embodiments (with reference to the attached drawings).

BRIEF DESCRIPTION OF THE DRAWINGS

FIG. 3 is a view illustrating an example of the data structure of a digital watermark information table according to the embodiment of the invention;

FIG. 7 is a flowchart showing the relationship of FIGS. 7A and 7B;

FIG. 7A is a flowchart illustrating an example of a copy process according to the embodiment of the invention;

DESCRIPTION OF THE EMBODIMENTS

Hereinafter, preferred embodiments of the invention will be described with reference to the accompanying drawings.

Figure 1:
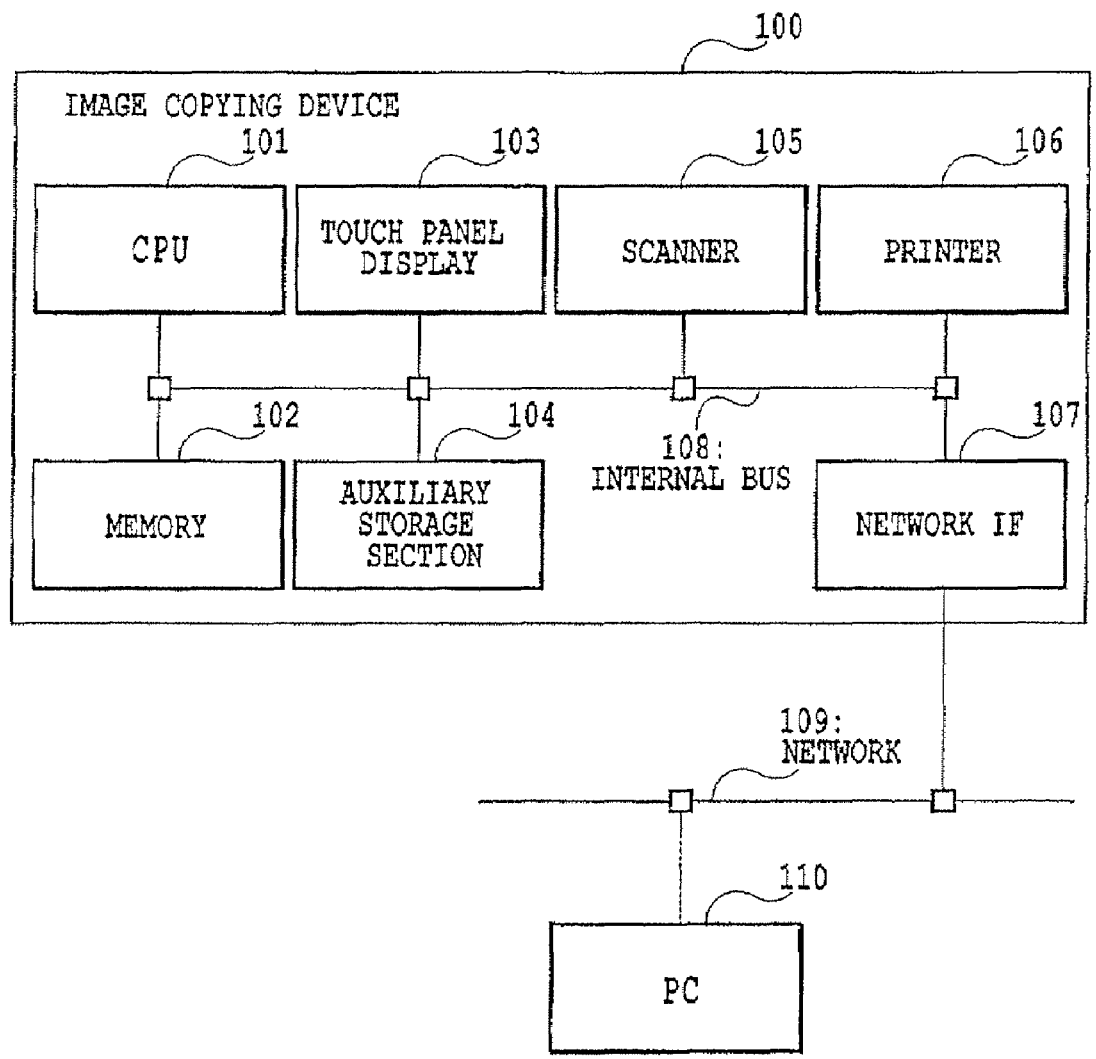
FIG. 1 is a block diagram illustrating an example of the hardware configuration of an image processing system according to an embodiment of the invention.

FIG. 1 is a view illustrating the hardware configuration of a system according to a first embodiment of the invention.

An image copying device 100 includes a CPU 101, a memory 102, a touch panel display 103, an auxiliary storage section 104, a scanner 105, a printer 106, and a network interface 107, and these components are connected to one another by an internal bus 108.

The CPU 101 executes a program loaded into the memory 102 or controls various devices.

The memory 102 stores a location where a program is to be loaded and data used in the program.

The touch panel display 103 provides a user with information and receives an input from the user.

The auxiliary storage section 104 is composed of a high-capacity storage section, such as a hard disk drive, so as to store information, which is difficult to be loaded into a memory, or store application programs.

The scanner 105 illuminates an image, which is formed on a document composed of sheets of paper or a sheet of paper, by means of a light source and then forms a reflected image on a charge coupled device through a lens. The charge coupled device generates an image reading signal having a predetermined resolution (for example, 600 dpi) and a predetermined density level (for example, 8 bits) and forms image data, which is composed of raster data, on the basis of the image reading signal.

The printer 106 prints electronic image data, which has been loaded into the memory 102, on recording paper.

The network interface 107 connects the image copying device 100 to a network such as an intranet. The network interface 107 makes print data or control signals, which are input through a network, stored in the memory 102 or transmits the print data or the control signals to the CPU 101.

The image copying device 100 is connected to a personal computer (hereinafter, referred to as a 'PC') 110 through a network 109.

First, there will be described a method of outputting recording paper in which information specified by a user and copy setting information, that is, 'image processing tolerance information of a digital watermark' are embedded. Here, the 'image processing tolerance information of a digital watermark' with respect to image processing means an image processing condition to be referred to at the time of a copy process. That is, the 'image processing tolerance information of a digital watermark' with respect to image processing means an image processing condition for completing image processing without losing an embedded digital watermark.

To sum up, a printer driver stored in the PC 110 embeds information with respect to image information, which is generated by using an application program stored in the PC 110, and outputs the embedded information as a PDL (page description language). The CPU 101 of the image copying device 100 performs a rendering process on the basis of the PDL acquired from the printer driver and performs a printing process on recording paper by using the printer 106. In the present embodiment, the printing process is performed after information that a user desires to embed is embedded in an image as a digital watermark and at the same time, image processing tolerance information of the digital watermark is embedded in the image as a barcode.

Figure 2:
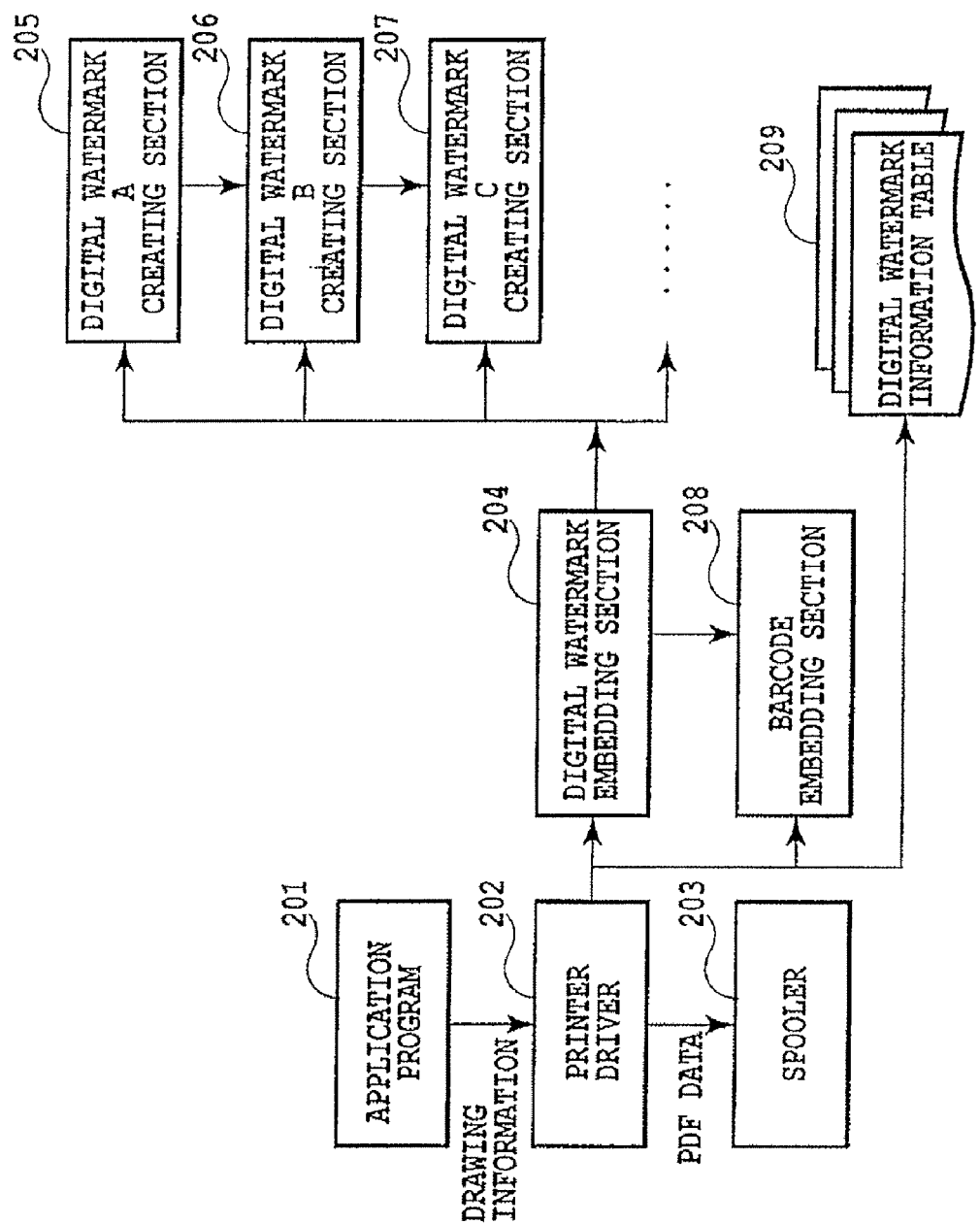
FIG. 2 is a block diagram illustrating an example of the configuration of a module of a print program according to the embodiment of the invention.

FIG. 2 is a block diagram illustrating the configuration of a program stored in the PC 110.

An application program 201 is a program that performs a process of editing an electronic document, and transmits the electronic document to a printer driver 202 as drawing information and then instructs a printing with respect to the electronic document that has been transmitted.

The printer driver 202 receives drawing information of the electronic document from the application program 201, converts the drawing information to PDL data, which can be analyzed by the image copying device 100, and then transmits the PDL data to a spooler 203.

The spooler 203 temporarily stores the PDL data, which has been received from the printer driver 202, and then sequentially outputs the PDL data to the image copying device 100.

A digital watermark embedding section 204 receives a call from the printer driver 202. The digital watermark embedding section 204 creates a digital watermark by using a digital watermark A creating section 205 that creates a digital watermark A, a digital watermark B creating section 206 that creates a digital watermark B, a digital watermark C creating section 207 that creates a digital watermark C, and the like. Then, the digital watermark embedding section 204 embeds the created digital watermark in the PDL data.

The digital watermarks A to C are printable and readable by a scanner. Known techniques may be used as an algorithm for creating a digital watermark, a method of embedding a digital watermark, or a method of extracting a digital watermark, and therefore detailed description thereof will be omitted in this specification.

In response to a call from the printer driver 202, a barcode embedding section 208 creates predetermined data as a barcode image and then embeds the created barcode image in the PDL data.

A digital watermark information table 209 is a table in which image processing tolerance information of a digital watermark that the printer driver 202 can handle is described.

In this table, details of an image processing, which may cause the digital watermarks A, B, C, and the like to be lost, are described.

FIG. 3 is a view illustrating an example of the data structure of the digital watermark information table 209.

As shown in FIG. 3, for example, three image processing tolerance information items are described in an information table of the digital watermark A. First information indicates that 'background elimination' for making background white and contrast of an image high is prohibited. Second information indicates that the reading resolution for reading out a printed image is equal to or larger than 20% of the dot size when a digital watermark is output. Third information indicates that expansion and reduction should not be performed when a read image is output.

Next, user setting when a printing process instructed from the application program 201 is performed will be described.

First, in the case when a digital watermark is embedded, a user causes the application program 201 to call a print setting screen of the printer driver 202.

Figure 4:
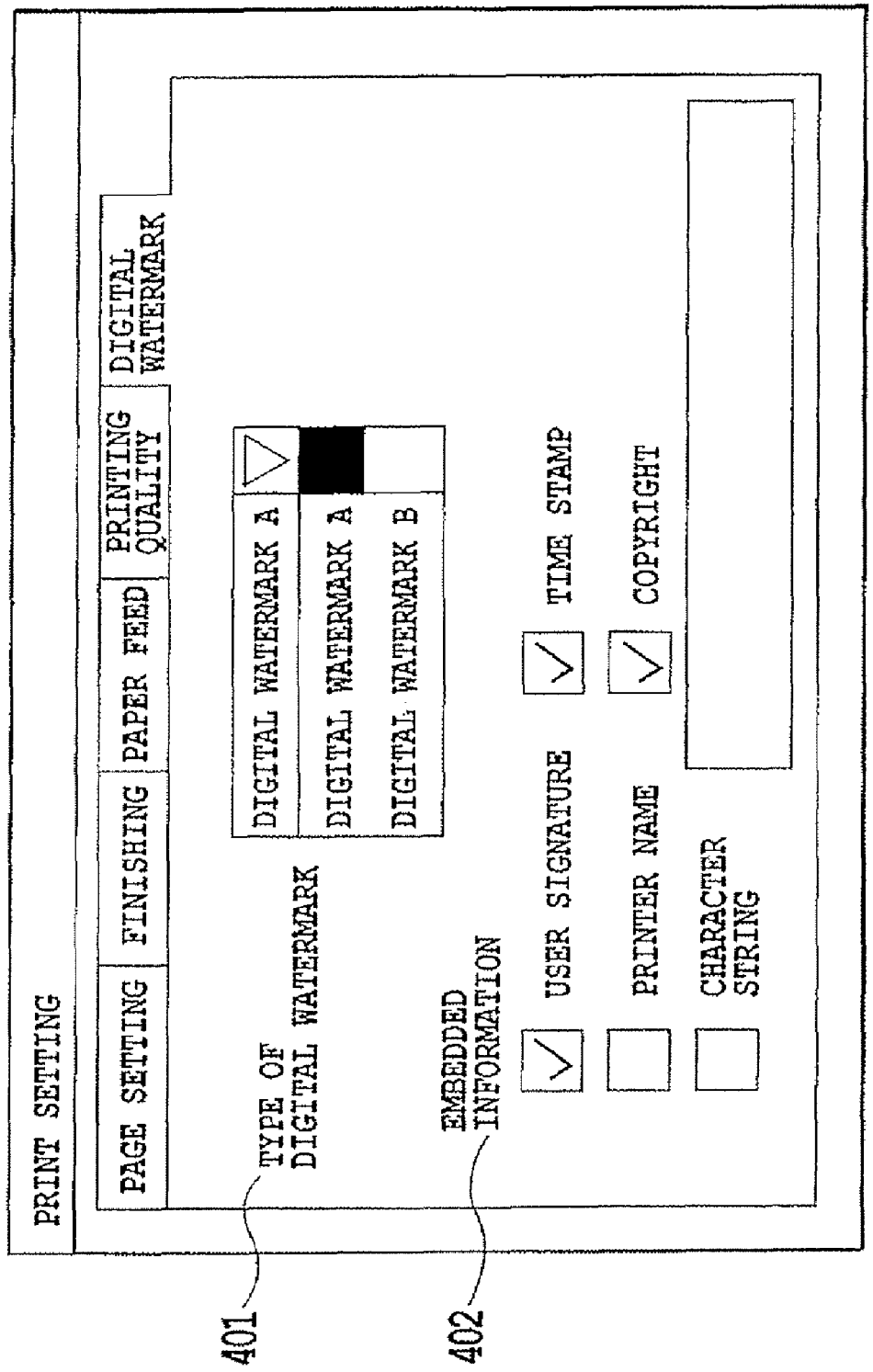
FIG. 4 is a view illustrating an example of a print setting screen according to the embodiment of the invention.

FIG. 4 is a view illustrating an example of the print setting screen (graphic user interface) of the printer driver 202.

A tab related to a digital watermark is shown on the print setting screen. A user decides the type of a digital watermark to be embedded by selecting the type of a digital watermark among selection items specified in types of digital watermarks, which are denoted by reference numeral 401. When the user selects 'no digital watermark', a digital watermark is not created.

Then, the user selects information, which is to be embedded as a digital watermark, from selection items denoted by reference numeral 402. The user individually selects, as information to be embedded, signature information on a user that instructs printing, time stamp information on print time, a name of a printer that performs printing, copyright information on an electronic document, and a predetermined character string.

Then, when the application program 201 receives a print instruction from the user, the application program 201 transmits the electronic document to the printer driver 202.

The printer driver 202 generates PDL data on the basis of drawing information received from the application program 201.

Thereafter, the printer driver 202 embeds a digital watermark including information to be embedded, which has been selected by the user, and image processing tolerance information of the digital watermark in the generated PDL data.

Figure 5:
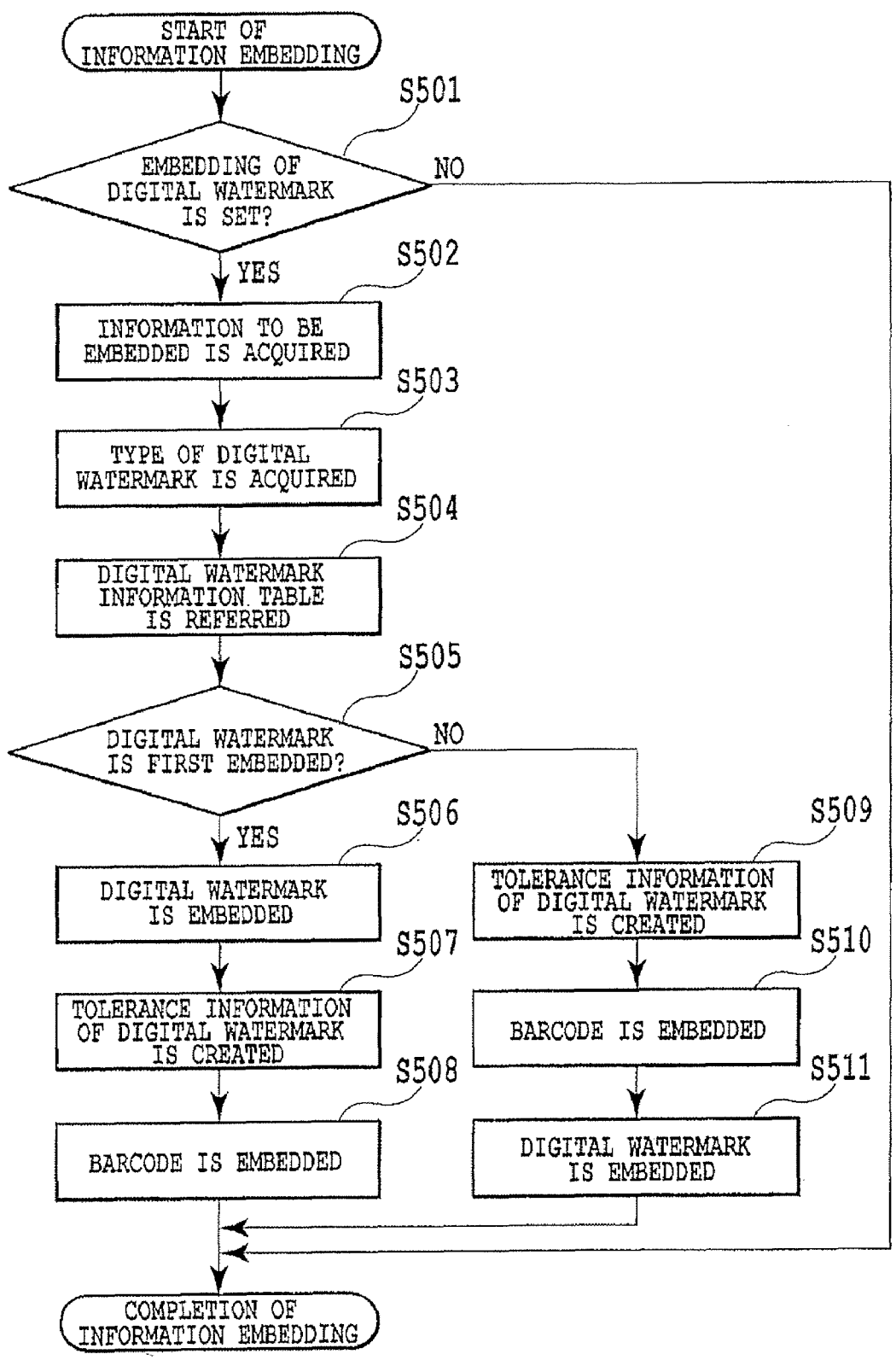
FIG. 5 is a flowchart illustrating an example of a process of embedding information according to the embodiment of the invention.

FIG. 5 is a flowchart illustrating an embedding process performed by the printer driver 202.

In step S501, it is determined whether or not embedding of a digital watermark is set on the print setting screen shown in FIG. 4. If the embedding of a digital watermark is set, the process proceeds to step S502. Otherwise, the process is completed without performing the embedding of a digital watermark.

In step S502, information to be embedded, which is embedded as a digital watermark, is acquired. If user signature is specified as the information to be embedded, the signature of a user registered in an operating system is acquired or inputting of a signature file is requested of a user. If a time stamp is specified as the information to be embedded, the printer driver 202 performs communication with an authentication location that is registered beforehand so as to acquire time stamp information. In the case when the printer name is specified as the information to be embedded, the printer driver 202 performs communication with the image copying device 100 having the printer 106 so as to acquire the printer name or device signature information. When copyright is specified as the information to be embedded, copyright information, which has been received beforehand as meta information from the application program 201 together with the drawing information, is used as the information to be embedded. In addition, when a predetermined character string is specified as the information to be embedded, a character string, which is set beforehand as setting of the printer driver 202, is used as the information to be embedded.

In step S503, the type of a digital watermark (digital watermark A, B, C), which is specified beforehand in the printer driver 202, is acquired.

In step S504, the digital watermark information table 209 is referred and image processing tolerance information of a digital watermark corresponding to the type of a digital watermark, which has been acquired in step S503, is acquired from the digital watermark information table 209. As described above, the image processing tolerance information of the digital watermark is created as a barcode.

In step S505, an order of embedding the barcode and the digital watermark obtained in step S503 is determined. For example, in the case of a digital watermark in which information is written in a blank portion of a printed page by using yellow dots, there is a possibility that the information will not be read if a barcode is embedded later. Accordingly, the barcode should be embedded before embedding the digital watermark. Each of the digital watermark creating sections 205 to 207 shown in FIG. 2 holds an information table in which affinity information on a barcode and the type of a digital watermark is described. The printer driver 202 determines an order of embedding the digital watermark and the barcode with reference to the affinity information. If it is determined that the digital watermark needs to be first embedded, the process proceeds to step S506. Otherwise, the process proceeds to step S509.

In step S506, the digital watermark is embedded in the PDL data that has been generated beforehand. The printer driver 202 calls the digital watermark embedding section 204 and then calls a digital watermark creating section according to the type of a digital watermark. The digital watermark creating sections 205 to 207 embed the information to be embedded, which has been acquired in step S502, in the PDL data as a digital watermark.

In step S507, the printer driver 202 finally decides information on an image processing, which is not to be performed with respect to recording paper that has been printed, on the basis of the PDL data, the print setting of the printer driver 202, and the image processing tolerance information of the digital watermark acquired in step S504. Here, the information on the image processing that is not to be performed means image processing tolerance information of a digital watermark. Then, the printer driver 202 creates a barcode that indicates information on the image processing.

In step S508, the printer driver 202 calls the barcode embedding section 208, and the barcode embedding section 208 embeds the barcode, which has been created in step S507, in the PDL data.

In steps S509 and S510, the same processes as in steps S507 and S508 are performed; however, in steps S509 and S510, a digital watermark is not yet embedded in PDL data in which a barcode is embedded, which is different from steps S507 and S508.

In step S511, a digital watermark is embedded in the PDL data, in the same manner as in step S506.

Hereinbefore, the process of embedding a digital watermark and image processing tolerance information of the digital watermark in the PDL data has been described.

Subsequently, the printer driver 202 transmits the PDL data, which has been acquired in the above-described embedding process, to the spooler 203. The spooler 203 temporarily stores the PDL data in a storage section (not shown) included in the PC 110. If the image copying device 100 is in a state in which the PDL data can be received, the spooler 203 transmits the PDL data to the image copying device 100 through the network 109.

When the CPU 101 receives the PDL data from the network interface 107, the CPU 101 temporarily stores the PDL data in the auxiliary storage section 104 and then sequentially loads the PDL data into the memory 102 as raster image information. Then, the CPU 101 transmits the loaded raster image information to the printer 106 so that an image can be printed on the recording paper. Thus, it is possible to print on recording paper an image in which a digital watermark including embedded information, which has been specified by a user, and image processing tolerance information of the digital watermark are embedded.

Next, a process of copying recording paper, which has been printed out in the above-described method, on another recording paper will be described.

Figure 6:
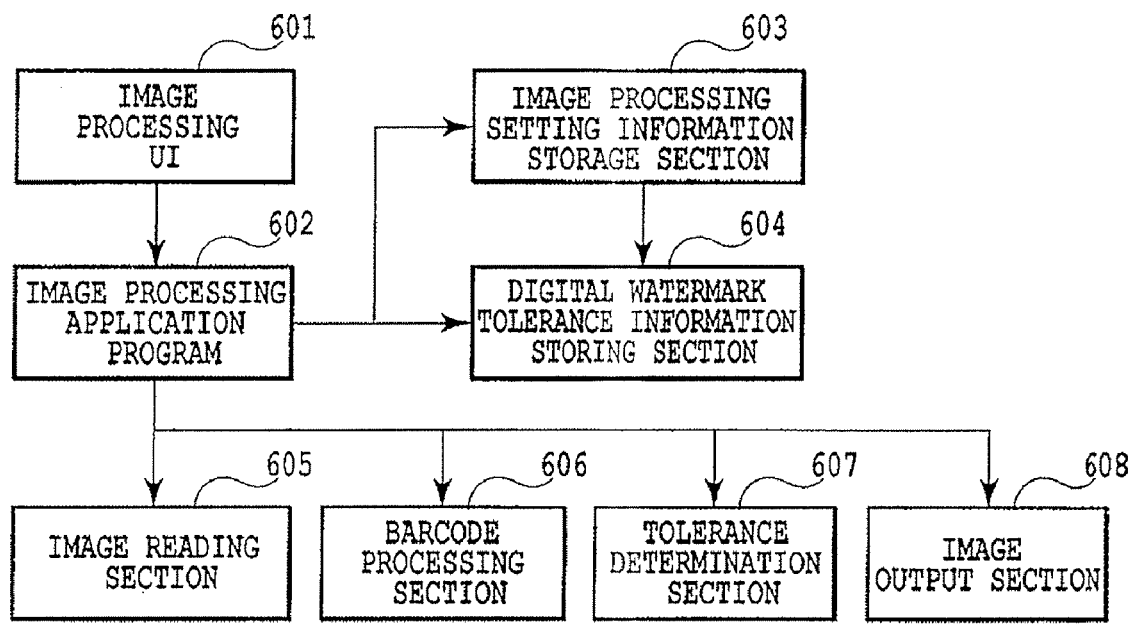
FIG. 6 is a block diagram illustrating an example of the configuration of a module of a print program according to the embodiment of the invention.

FIG. 6 is a block diagram illustrating the configuration of a program that causes the image copying device 100 to perform a copy process.

An image processing user interface 601 displays a graphic user interface setting screen, which is provided for a copy setting, on the touch panel display 103 such that a copy setting or a copy start instruction can be received from a user.

An image processing application program 602 is a program that controls the flow of a copy process.

An image processing setting information storage section 603 stores copy setting information, that is, image processing setting information, which has been input by a user.

A digital watermark image processing tolerance information storing section 604 stores image processing tolerance information of a digital watermark, which is embedded in an image printed on the recording paper by means of the above-described printing process, with respect to an image processing. The image processing tolerance information of the digital watermark is acquired from a barcode embedded in an image.

An image reading section 605 handles the scanner 105.

A barcode processing section 606 detects a barcode from an image that has been read by the scanner 105, extracts image processing tolerance information of a digital watermark from the barcode, and stores the extracted barcode in the digital watermark image processing tolerance information storing section 604.

A tolerance determination section 607 compares image processing setting information set by the user with the image processing tolerance information of the digital watermark and determines whether or not the image processing setting information includes an image processing that is prohibited. In addition, a comparison between tolerance of the barcode and the image processing setting information is also performed.

An image output section 608 causes the printer 106 to operate so as to output image information on recording paper.

First, when a copy process is performed, the image processing user interface 601 displays on the touch panel display 103 instructions that request a user to set recording paper and to perform various input operations for copy setting. The user who has received these instructions sets the recording paper on the scanner 105 and performs the copy setting. The image processing user interface 601 receives the copy setting and then, if a copy starting instruction is made on the touch panel display 103, the image processing user interface 601 instructs the image processing application program 602 to start the copy process.

Figure 7B:
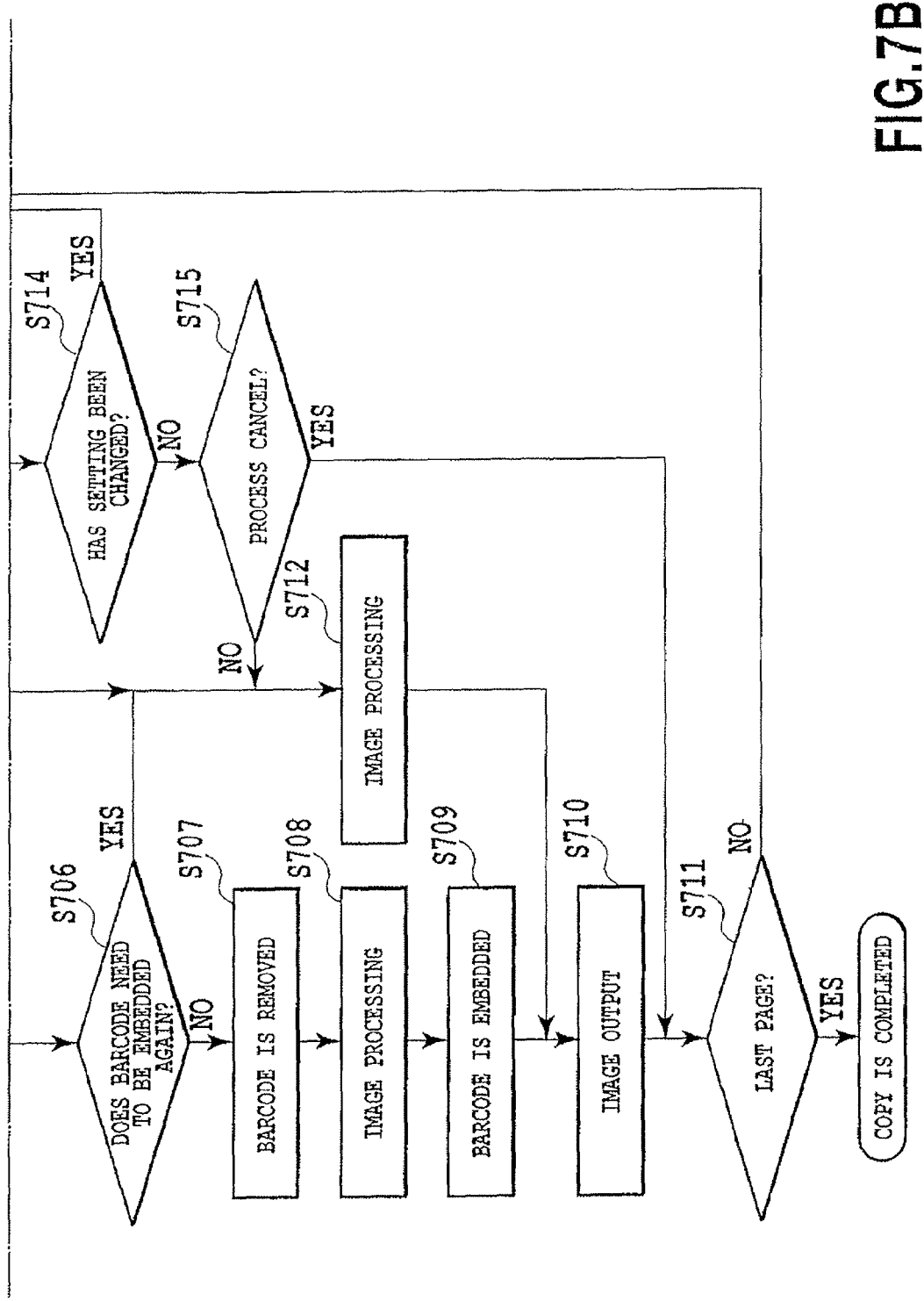
FIG. 7B is a flowchart illustrating an example of a copy process according to the embodiment of the invention.

FIG. 7A-7B is a flowchart illustrating the above-described copy process in detail.

In step S701, the image processing application program 602 instructs the image reading section 605 to read out a sheet of paper document set in the scanner 105. An image that has been read out is stored in the memory 102.

In step S702, the barcode processing section 606 detects a barcode embedded in the paper document that is copied. For this reason, the barcode processing section 606 scans the memory 102 that stores the read image so as to detect a barcode included in the image. If a barcode can be detected, the process proceeds to step S703. Otherwise, it is determined to be a copy process with respect to recording paper in which a digital watermark is not embedded, and then the process proceeds to step S712.

In step S703, the barcode processing section 606 analyzes the barcode that has been detected in step S702, acquires image processing tolerance information of a digital watermark, and stores the acquired image processing tolerance information of the digital watermark in the digital watermark image processing tolerance information storing section 604.

In step S704, the tolerance determination section 607 compares the image processing tolerance information, which has been acquired in step S703, with the image processing setting information stored in the image processing setting information storage section 603. The image processing setting information is image processing setting information that a user has set through a user interface. As a result of the comparison, if an image processing condition that conflicts between the image processing tolerance information and the image processing setting information exists, the tolerance determination section 607 determines that the digital watermark is lost due to the image processing.

In step S705, if the tolerance determination section 607 determines that the digital watermark has not been lost in step S704, that is, if the tolerance determination section 607 determines that the image processing condition that conflicts between the image processing tolerance information and the image processing setting information does not exist, the process proceeds to step S706. In contrast, if the tolerance determination section 607 determines that the digital watermark has been lost, that is, if the tolerance determination section 607 determines that the image processing condition that conflicts between the image processing tolerance information and the image processing setting information exists, the process proceeds to step S713 so as to perform a process of changing the image processing setting information. Here, an example is assumed in which image processing tolerance information (image processing condition) including only a color copy is embedded in a digital watermark and image processing setting information (image processing condition) including only a black and white copy and a character mode is set in a user interface setting.

In this case, the color copy and the black and white copy conflict with each other. As a result, the image processing tolerance information and the image processing setting information conflict with each other. For this reason, in this case, the process proceeds to step S713.

Further, another example is assumed in which image processing tolerance information including only a color copy is embedded in a digital watermark and image processing setting information including only a character mode is set in a user interface setting. In this case, an image processing condition that conflicts between both the image processing conditions does not exist. For this reason, in this case, the process proceeds to step S706.

In step S706, when the image processing has been performed on the basis of the image processing setting information, it is determined whether or not a barcode needs to be embedded again. If the tolerance determination section 607 determines that there is any possibility that the tolerance of a barcode will disappear due to the image processing and a barcode will not be read out in the case of, for example, a recopy, the process proceeds to step S707. In addition, since limitation on the number of copying times is described in the image processing tolerance information of the digital watermark that has been read out in step S703, the process proceeds to step S707 if it is determined that a barcode should be changed. When the barcode is changed, the image processing tolerance information of the digital watermark stored in the digital watermark image processing tolerance information storing section 604 is changed. In contrast, if it is determined that a barcode is not affected even if an image processing is performed, the process proceeds to step S712.

In step S707, the barcode processing section 606 removes the barcode from image information on the memory 102.

In step S708, the image processing application program 602 performs an image processing with respect to image information on the memory 102 on the basis of the image processing setting information set through the user interface.

In step S709, the barcode processing section 606 generates a new barcode on the basis of image processing tolerance information of the changed digital watermark and then embeds the new barcode in the image information on the memory 102.

In step S710, the image output section 608 transmits the image information on the memory 102 to the printer 106 so as to print the image information on recording paper.

In step S711, the image reading section 605 inquires of the scanner 105 whether or not a printed page is a last page. Alternatively, the image processing user interface 601 inquires of the user, through the touch panel display 103, whether or not the printed page is a last page. If the printed page is determined to be a last page, the image reading section 605 completes the copy process. Otherwise, the process proceeds to step S701 in which a next document is read out.

In step S712, an image processing with respect to the image information on the memory 102 is performed on the basis of the image processing setting information, in the same manner as in step S708.

In step S713, when it is determined that, if an image processing is performed by using an image processing set value set by the user, a digital watermark may not be read out because the digital watermark is lost, a process of changing an image processing set value is performed. That is, if it is determined that an image processing condition, which conflicts between the image processing tolerance information and the image processing setting information, may exist, the process of changing the image processing set value is performed.

Here, the process of changing the image processing set value, which is performed in step S713, will be described in detail.

Figure 8:
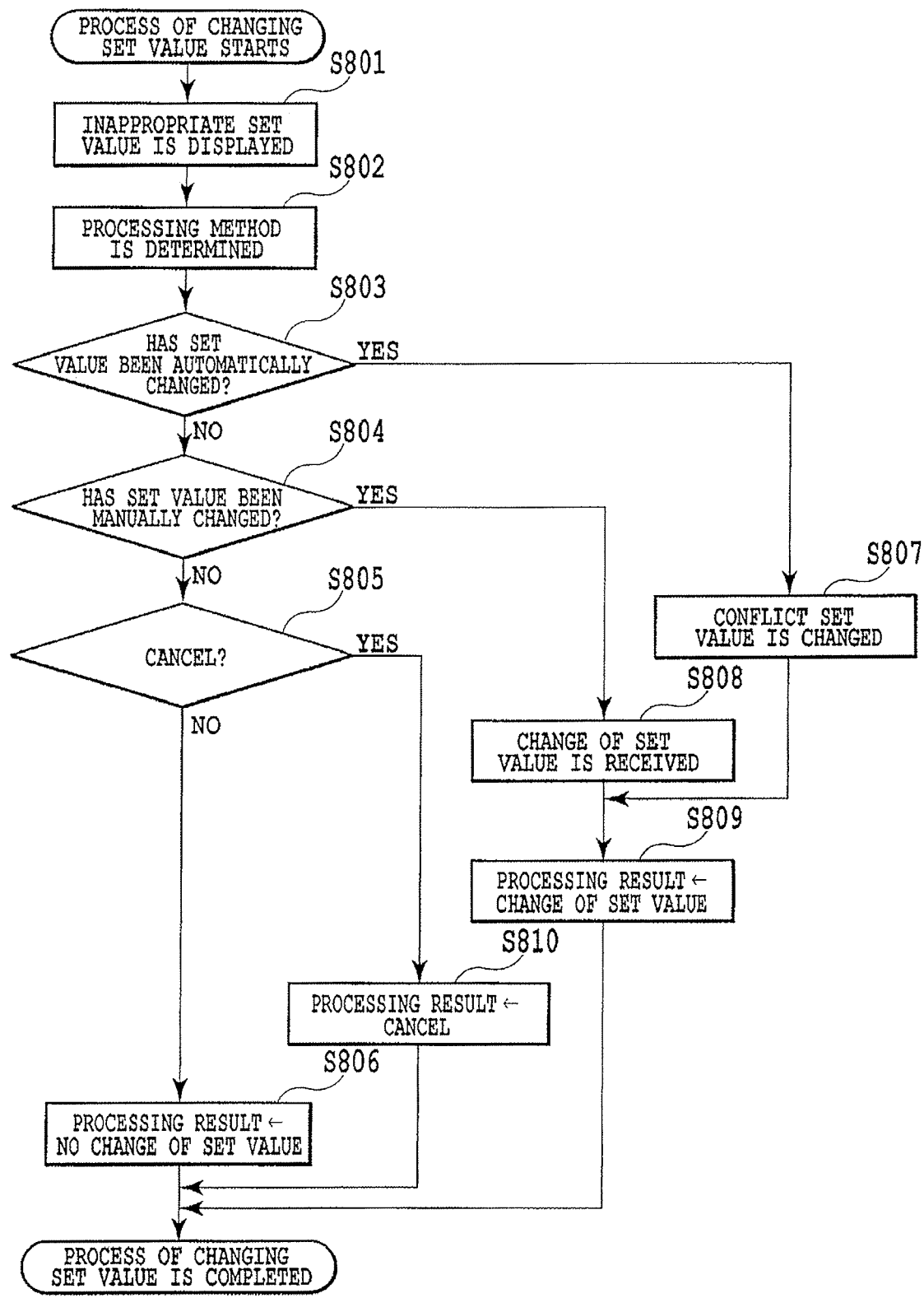
FIG. 8 is a flowchart illustrating an example of a process of changing a set value held as image processing setting information according to the embodiment of the invention.

FIG. 8 is a flowchart illustrating a process of changing a set value held as image processing setting information.

In step S801, the image processing user interface 601 causes a set value, which has been determined to be inappropriate in step S705, to be displayed on the touch panel display 103, thereby issuing a warning on the user.

In step S802, a processing method of changing the inappropriate set value is determined. The processing method includes 'a device automatically changes a set value', 'a user selects and changes a set value', 'a process stops', and 'a process continues without changing a set value'. The processing method may be determined depending on algorithm set beforehand in a device. Alternatively, the image processing user interface 601 may cause selection items to be displayed on the touch panel display 103 so that the user can select the processing method.

In step S803, it is determined whether or not 'a device automatically changes a set value' has been selected in step S802. If 'a device automatically changes a set value' has been selected, the process proceeds to step S807. Otherwise, the process proceeds to step S804.

In step S804, it is determined whether or not 'a user selects and changes a set value' has been selected, that is, a manual change of a set value has been selected. If 'a user selects and changes a set value' has been selected, the process proceeds to step S805. Otherwise, the process proceeds to step S808.

In step S805, it is determined whether or not 'a process stops' has been selected, that is, 'cancel' has been selected. If 'a process stops' has been selected, the process proceeds to step S810. Otherwise, the process proceeds to step S806.

In step S806, as a result of a series of determinations in steps S803 to S805, 'a process continues without changing a set value' is stored in the memory 102 and then the process of changing the image processing set value is completed.

In step S807, a process in the case when it is determined to be 'a device automatically changes a set value' is performed. In this process, the tolerance determination section 607 automatically changes the inappropriate set value to an appropriate set value on the basis of algorithm stored therein and the image processing tolerance information of the digital watermark, and then the process proceeds to step S809. An specific example of a process in step S807 will be described.

First, a part of the image processing setting information set by the user interface, which conflicts with the image processing tolerance information of the digital watermark, is changed. For example, in the case when a black and white copy setting is included in the image processing setting information set by the user interface and a color copy setting is included in the image processing tolerance information of the digital watermark, the black and white copy setting is changed to the color copy setting. In this case, other parts of the image processing setting information set by the user interface, which do not conflict with the image processing tolerance information of the digital watermark, are not changed. For example, in the case when a character mode (mode for making a background elimination effect strong) is included in the image processing setting information set by the user interface and an item related to the background elimination is not included in the image processing tolerance information of the digital watermark, the character mode is maintained. Thus, a new and appropriate set value is created.

In step S808, a process in the case when it is determined to be 'a user selects and changes a set value' is performed. The image processing user interface 601 causes a user interface for setting change to be displayed on the touch panel display 103 so as to receive a setting change from the user. When the user inputs completion of the setting change, the process proceeds to step S809.

In step S809, as a result of the set value changing process, 'a set value has been changed' is stored in the memory 102 and then the process of changing the image processing set value is completed.

In step S810, a process in the case when it is determined to be 'a process stops' is performed. In this process, the 'cancel' of the set value changing process is stored in the memory 102 and then the process of changing the image processing set value is completed.

Hereinbefore, the process of changing the image processing set value, which is performed in step S713 of FIG. 7A-7B, has been described.

Referring back to the flowchart shown in FIG. 7A-7B, an explanation on the copy process continues.

In step S714, it is determined whether or not the image processing set value has been changed in step S713. If it is determined that the image processing set value has been changed, the process proceeds to step S704 in which it is determined whether or not the changed image processing set value is appropriate. If the image processing set value has not been changed, the process proceeds to step S715.

In step S715, it is determined whether or not a result of the process in step S713 is the 'cancel'. In the case when the result is determined to be the 'cancel', the process proceeds to step S711. In the case when the result is determined not to be the 'cancel', the process proceeds to step S712 in which an image processing is performed by using current image processing setting.

In the first embodiment described above, the configuration in which an image processing condition that does not allow a digital watermark to be lost is embedded in a barcode has been adopted. Therefore, when copying a paper document printed with an image in which a digital watermark is embedded, it is possible to eliminate a possibility that, as a result of an image processing, the digital watermark will be lost unlike the intention of the user and thus a copied material in which the digital watermark is not embedded will be generated. Further, in the first embodiment described above, the copy process does not depend on the type of a digital watermark embedded in an image. In other words, it is sufficient to be able to analyze only a high-tolerance barcode indicating image processing tolerance information of a digital watermark. Accordingly, various kinds of digital watermarks can be handled in the first embodiment. Furthermore, in the first embodiment described above, it is preferable to read out only a barcode. In this case, since it is not necessary to read out information on a digital watermark, processing time can be reduced.

Here, a barcode, which is a kind of digital watermark, has a high tolerance, but the amount of information thereof is small. In other words, since each bar has a large occupation area, there is little possibility that the barcode will disappear when copied or the barcode will be dirty so as not to be readable. In contrast, since each bar (each bar has 1-bit information) has the large occupation area, the amount of information is small. On the other hand, a digital watermark has a low tolerance, but the amount of information thereof is large.

For this reason, in the present embodiment, the configuration in which an image processing condition that does not allow a digital watermark to be lost is embedded within a barcode has been adopted. In other words, this configuration may be explained as follows. That is, an image processing condition that does not allow a digital watermark, which has a low tolerance and a large amount of information, to be lost is embedded in a digital watermark having a high tolerance and a small amount of information.

If only a digital watermark having a high tolerance and a small amount of information is printed on a sheet, the amount of information on the sheet becomes greatly reduced. On the other hand, in the case when only a digital watermark having a low tolerance and a large amount of information is printed on a sheet, it makes the information disappear to simply copy the sheet.

However, in the same manner as in the first embodiment, by embedding an image processing condition, which does not allow a digital watermark having a low tolerance and a large amount of information to be lost, in a digital watermark having a high tolerance and a small amount of information, it is possible to embed a large amount of information and to prevent information from disappearing when copied. In addition, it is possible to decode only information within a digital watermark having a high tolerance and a small amount of information without the need of decoding information within a digital watermark having a low tolerance and a large amount of information. As a result, the processing time can be reduced. The reason is that the processing time can be reduced as much as the reduced amount of information that should be decoded.

Furthermore, in the first embodiment described above, embedding of a digital watermark and embedding of a barcode indicating image processing tolerance information of the digital watermark have been performed by using a printer driver. However, the embedding of the digital watermark and the embedding of the barcode indicating the image processing tolerance information of the digital watermark may be performed by using an application program. In this case, the application program generates an image in which a digital watermark and a barcode are embedded and then causes the printer driver to form the image. In this case, it is possible to print on recording paper an image in which a digital watermark and image processing tolerance information of the digital watermark are embedded, without depending on the type of a printer.

Furthermore, it is possible to consider a configuration in which the embedding of a digital watermark is performed by the application program and the embedding of image processing tolerance information of the digital watermark is performed by the printer driver. In this case, the application program informs the printer driver of the image processing tolerance information of the digital watermark.

In the first embodiment described above, the PC 110 transmits to the printer 106 a digital watermark, a barcode indicating image processing tolerance information of the digital watermark, and print information of an electronic document. Then, the printer 106 outputs a paper document in which the digital watermark and the image processing tolerance information of the digital watermark are embedded. On the other hand, in a second embodiment, when a typical paper document in which a digital watermark is not embedded is copied by the use of the image copying device 100, the image copying device 100 embeds a digital watermark and image processing tolerance information of the digital watermark.

The hardware configuration of a system according to the second embodiment is the same as the configuration shown in FIG. 1.

Figure 9:
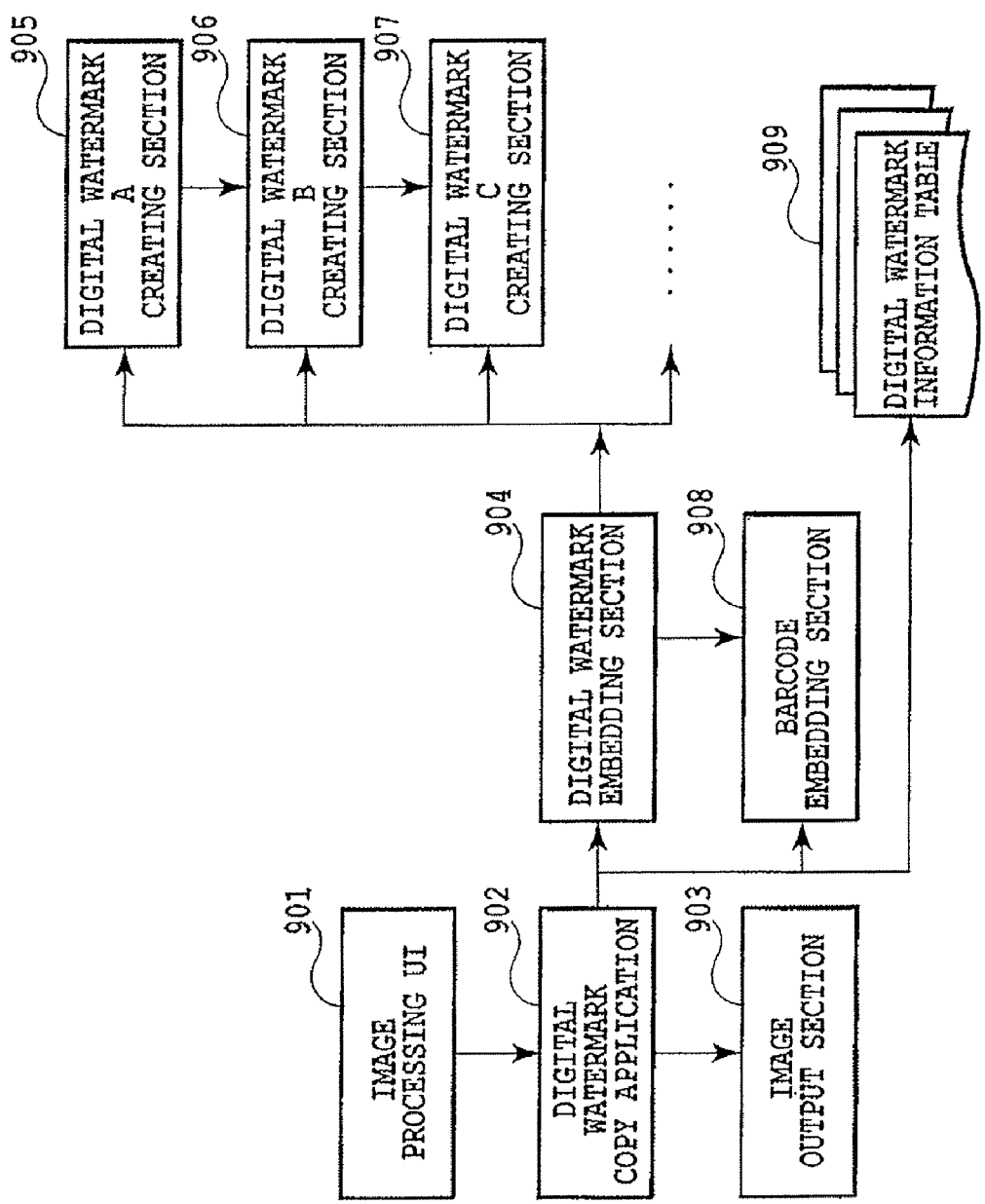
FIG. 9 is a block diagram illustrating an example of the configuration of a module of a print program according to another embodiment of the invention.

FIG. 9 is a block diagram illustrating the configuration of a program that causes the CPU 101 of the image copying device 100 to perform a copy while embedding a digital watermark, at the time of copy.

An image processing user interface 901 displays a graphic user interface on the touch panel display 103 such that a copy setting or a copy start instruction can be received from a user.

A digital watermark copy application program 902 makes the entire control on a process in which a copy is performed while a digital watermark is embedded.

An image output section 903 causes the printer 106 to operate so as to output image information on recording paper.

A digital watermark embedding section 904, digital watermark creating sections 905 to 907, a barcode embedding section 908, and a digital watermark information table 909 are programs having the same functions as the digital watermark embedding section 204, the digital watermark creating sections 205 to 207, the barcode embedding section 208, and the digital watermark information table 209 shown in FIG. 2.

Figure 10:
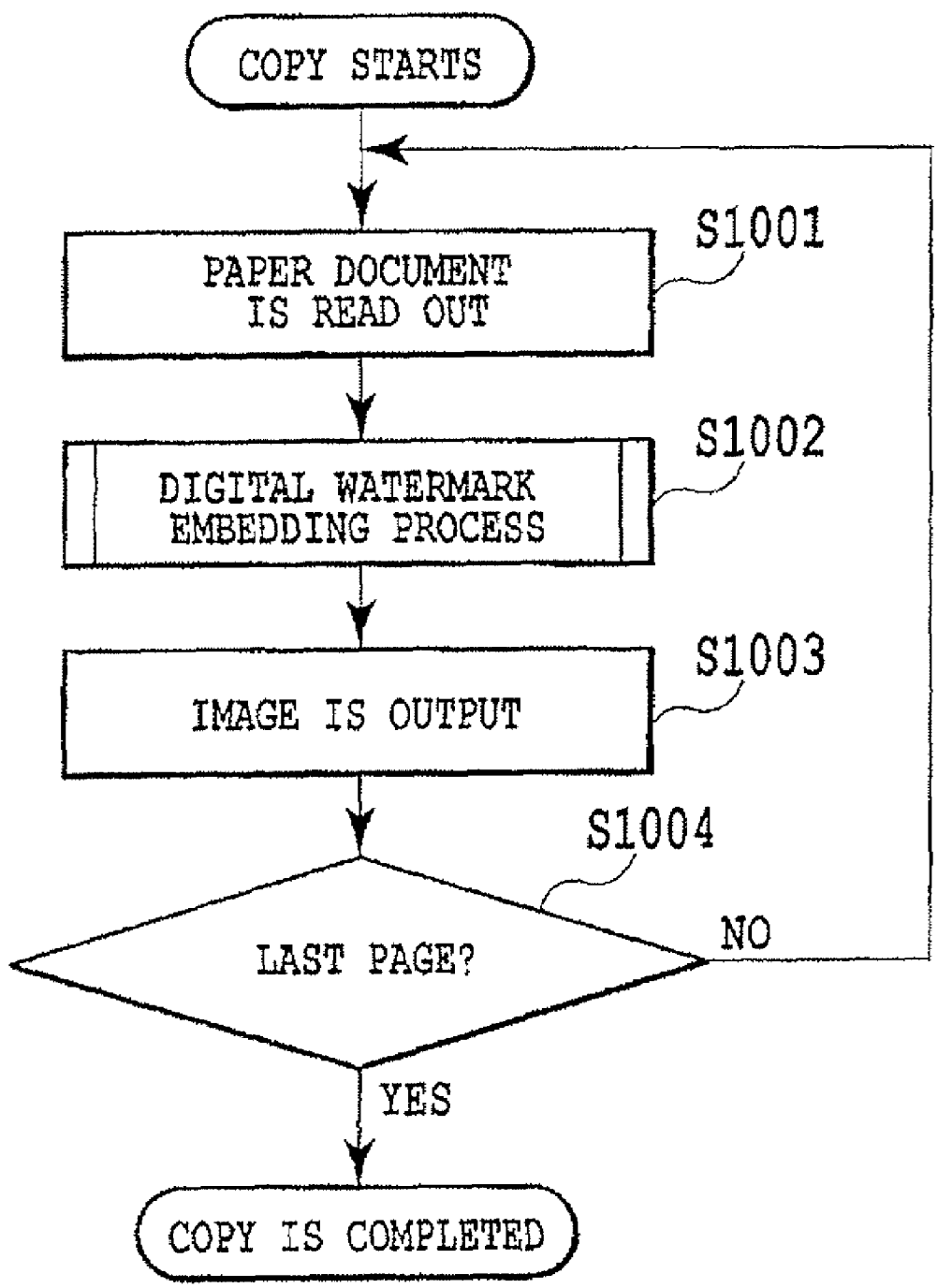
FIG. 10 is a flowchart illustrating an example, in which a copy is performed while a digital watermark is embedded, according to the embodiment of the invention.

FIG. 10 is a flowchart illustrating the process in which a copy is performed while a digital watermark is embedded.

First, before starting the copy process, the image processing user interface 901 displays on the touch panel display 103 a user interface, which is the same as the user interface shown in FIG. 4 in the first embodiment. Then, the image processing user interface 901 requests a user to input the type of a digital watermark and embedded information embedded in the digital watermark. Subsequently, the user sets a document, which is to be copied, on the scanner 105 and then instructs the start of a copy process.

In step S1001, the scanner 105 reads out a sheet of paper document set therein. Image data that has been read out is stored in the memory 102.

In step S1002, a process of embedding a digital watermark is performed. The process of embedding a digital watermark is the same as that shown in FIG. 5. In the second embodiment, the process performed by the printer driver 202 in the first embodiment is performed by the digital watermark copy application program 902. In the first embodiment, a digital watermark and a barcode indicating image processing tolerance information of the digital watermark are embedded in PDL data. On the other hand, in the second embodiment, a digital watermark and a barcode indicating image processing tolerance information of the digital watermark are embedded in image data stored in the memory 102.

In step S1003, the image output section 903 transmits an image, in which the digital watermark and the image processing tolerance information of the digital watermark are embedded, to the printer 106, and the printer 106 prints the received image on the recording paper.

In step S1004, the digital watermark copy application program 902 inquires of the scanner 105 whether or not a printed page is a last page. Alternatively, the image processing user interface 901 inquires of the user, through the touch panel display 103, whether or not the printed page is a last page. If the printed page is determined to be a last page, the digital watermark copy application program 902 or the image processing user interface 901 completes the copy process. Otherwise, the process proceeds to step S1001 in which a next document is read out.

In the second embodiment described above, it is possible to perform a copy process while embedding a digital watermark and image processing tolerance information of the digital watermark.

In the first embodiment, when copying recording paper printed with an image in which a digital watermark is embedded, it is possible to eliminate a possibility that the embedded digital watermark will be lost unlike the intention of the user and thus a copied material in which the digital watermark cannot be read out will be generated. However, the copied material is not limited to recording paper. For example, electronic data may be used.

Next, it will be described about a process of scanning recording paper, which is output by using the method according to the first embodiment or the second embodiment, and then converting the scanned data to electronic data.

The hardware configuration of a system according to a third embodiment is the same as the configuration shown in FIG. 1.

The configuration of a program according to the third embodiment is the same as that shown in FIG. 6; however, the process performed by the image output section 608 is different.

A flowchart in which the program according to the third embodiment generates electronic data is substantially equal to that shown in FIG. 7A-7B. However, processes in steps S704 and S710 are different. In the first embodiment, the image processing tolerance information of the digital watermark is compared with the image processing setting information in step S704. On the other hand, in the third embodiment, image processing tolerance information of a digital watermark is compared with an image processing setting necessary to be stored as electronic data. Further, in the first embodiment described above, an image is output on recording paper in step S710. On the other hand, in the third embodiment, the image output section 608 stores image information on the memory 102, as electronic data, in the auxiliary storage section 104. The location where electronic data is to be stored is not limited to the auxiliary storage section 104. For example, the electronic data may be transmitted, through the network interface 107, to a PC or a facsimile device connected to the image copying device 100.

In the third embodiment described above, when converting a paper document, which is printed with an image in which a digital watermark is embedded, to electronic data, for example, it is possible to prevent an electronic data in which the digital watermark is not embedded from being generated, unlike the intention of a user.

In the first to third embodiments described above, examples in which image processing tolerance information of a digital watermark is indicated by the use of a barcode have been described. However, the invention is not limited to the barcode. For example, a QR code may be used. Alternatively, other than these typical codes described above, it is possible to use a code that may indicate image processing tolerance information of a digital watermark and be printed and that a scanner may extract from the printed recording paper. Here, it is preferable to perform embedding and extracting of the code separately from the embedding and extracting of a digital watermark.

In the first to third embodiments, a process of embedding a low-tolerance watermark, such as a digital watermark, and a high-tolerance watermark, such as a barcode, in a document is performed. The high-tolerance watermark is advantageous in that the high-tolerance watermark does not easily disappear even if copied, but is disadvantageous in that the high-tolerance watermark cannot include a large amount of information. In contrast, the low-tolerance watermark is advantageous in that the low-tolerance watermark can include a large amount of information, but is disadvantageous in that the low-tolerance watermark easily disappears if copied. Taking the above-described characteristics of the high-tolerance watermark and the low-tolerance watermark into consideration, in the first to third embodiments, a relatively low-tolerance watermark such as a digital watermark includes a large amount of information, for example, copyright information. In addition, a relatively high-tolerance watermark such as a barcode includes a small amount of information, for example, 'copy setting information' that does not allow a low-tolerance watermark to be lost. However, if the amount of information to be embedded in the low-tolerance watermark is small, the information may also be embedded in the high-tolerance watermark. For example, a method may be used in which, if the amount of information to be embedded in the low-tolerance watermark is equal to or less than a predetermined threshold value, the information is embedded in the high-tolerance watermark. In the first to third embodiments, it is necessary to perform two different kinds of embedding processes in order to embed two kinds of watermarks including a low-tolerance watermark and a high-tolerance watermark. However, in a fourth embodiment, since it is sufficient to embed only a high-tolerance watermark, an embedding process may be performed in high speed.

Until now, an example in which information is embedded by using a digital watermark has been described. However, it may be possible to use another method other than a method of using the digital watermark as long as information is embedded in a paper document in the form of a print. Furthermore, the image copying device according to the embodiments of the invention is not limited to the image copying device shown in FIG. 1, but various devices, such as a dedicated image copying device or a general-purpose computer, may be used. In the case of an execution made by a general-purpose computer, a computer-executable program including a program code is read out by the general-purpose computer such that the general-purpose computer executes each step of an image processing method. A program that causes a general-purpose computer to execute an image processing may be read out from a ROM included in the general-purpose computer, a recording medium that can be read out by the general-purpose computer, or a server through a network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-288502 filed Sep. 30, 2005, 2006-138320 filed May 17, 2006 and 2006-29486 filed Aug. 25, 2006, which are hereby incorporated reference herein in their entirety.

What is claimed is:

1. An image processing system comprising:
a printing unit for embedding a first watermark and a second watermark having a higher tolerance than said first watermark to print a material, the second watermark including an image processing condition for retaining the first watermark even after copy;
a detecting unit for reading out an image on the material printed by said printing unit and detecting the second watermark;
a copying unit for copying the image using the image processing condition for retaining the first watermark even after a copy is detected by the detecting unit.

2. The image processing system as claimed in claim 1, further comprising a modifying unit for modifying an image processing set value specified by user through a operation panel using the image processing condition included in the second watermark.

3. The image processing system as claimed in claim 2, wherein said modifying unit compares the image processing condition included in the second watermark with the image processing set value specified by user through the operation panel and modifies the image processing set value if it is determined that the first watermark is lost when processing the image using the image processing set value specified by user.

4. The image processing system as claimed in claim 2, wherein said modifying unit modifies the image processing set value automatically or according to a specification from the user.

5. The image processing system as claimed in claim 1, further comprising a warning unit for comparing the image processing condition included in the second watermark with an image processing set value specified by the user through the operation panel and issuing a warning on the user if it is determined that the first watermark is lost when processing the image using the image processing set value specified by the user.

6. A method comprising:
- a printing step for embedding a first watermark and a second watermark having a higher tolerance than said first watermark to print a material, the second watermark including an image processing condition for retaining the first watermark even after copy;
- a detecting step for reading out an image on the material printed in said printing step and detecting the second watermark;
- a copying step for copying the image using an image processing condition for retaining the first watermark even after a copy is detected in the detecting step.

7. The method as claimed in claim 6, further comprising a modifying step for modifying an image processing set value specified by a user through a operation panel using the image processing condition included in the second watermark.

8. The method as claimed in claim 7, wherein said modifying step compares the image processing condition included in the second watermark with the image processing set value specified by the user through the operation panel and modifies the image processing set value if it is determined that the first watermark is lost when processing the image using the image processing set value specified by the user.

9. The method as claimed in claim 7, wherein said modifying step modifies the image processing set value automatically or according to a specification from the user.

10. The image processing system as claimed in claim 6, further comprising a warning step for comparing the image processing condition included in the second watermark with the image processing set value specified by the user through the operation panel and issuing a warning on the user if it is determined that the first watermark is lost when processing the image using an image processing set value specified by the user.

11. A program on a computer-readable medium for causing a computer to perform a method, the method comprising:
- a printing step for embedding a first watermark and a second watermark having a higher tolerance than said first watermark to print a material, the second watermark including an image processing condition for retaining the first watermark even after copy;
- a detecting step for reading out an image on the material printed in said printing step and detecting the second watermark;
- a copying step for copying the image using an image processing condition for retaining the first watermark even after a copy is detected in the detecting step.

* * * * *